Feb. 14, 1967   R. S. COHEN   3,303,822
AUTOMATIC ANIMAL SELECTIVE FEEDER
Filed Aug. 2, 1965   2 Sheets-Sheet 2
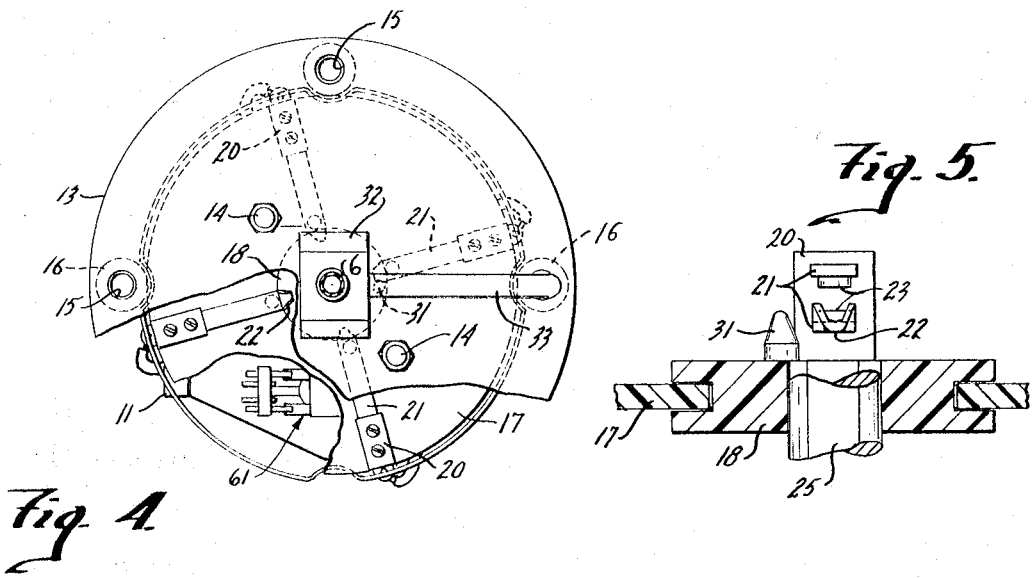
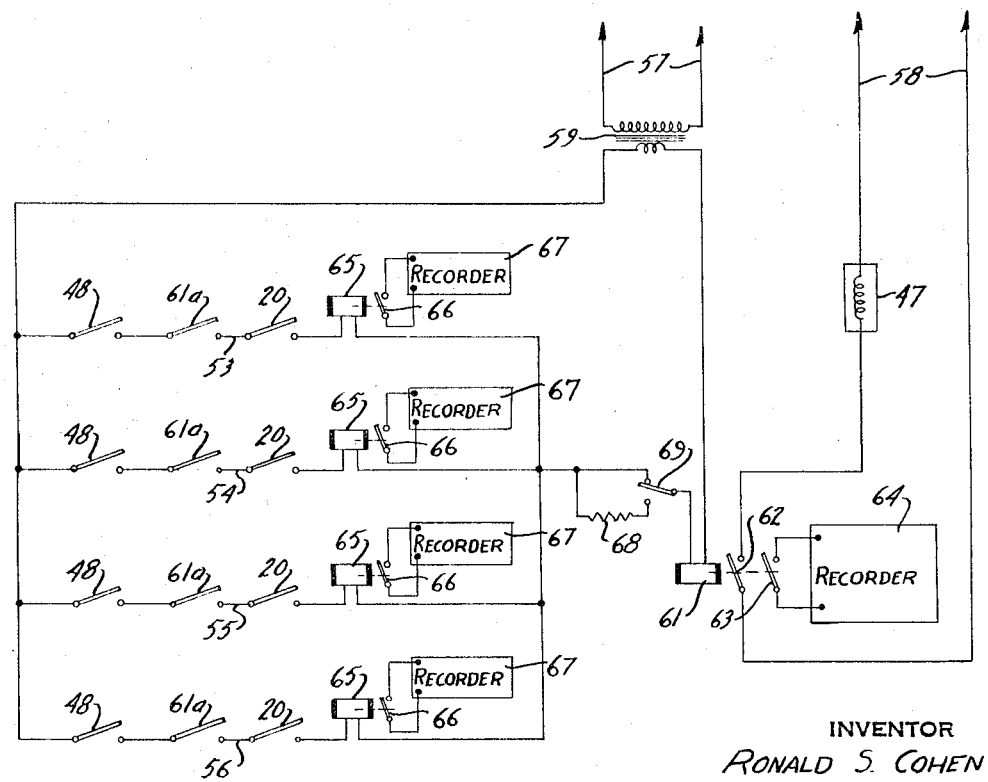
INVENTOR
RONALD S. COHEN
BY
Andrus & Starke
Attorneys United States Patent Office 3,303,822
Patented Feb. 14, 1967

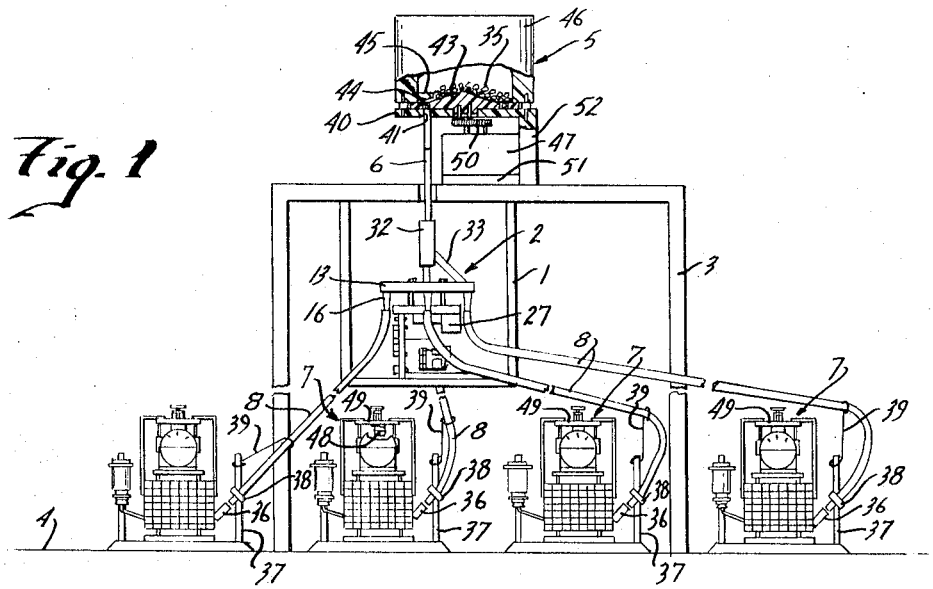

3,303,822
AUTOMATIC ANIMAL SELECTIVE FEEDER
Ronald S. Cohen, Milwaukee, Wis., assignor to Modern Teaching Associates, Inc., Milwaukee, Wis., a corporation of Wisconsin
Filed Aug. 2, 1965, Ser. No. 476,324
11 Claims. (Cl. 119—51)

This invention relates to an automatic selection feeder for animals and particularly has reference to an automatic feeder for providing feed to a number of animals who are confined in a plurality of separate cages such as the cages described in the copending application Serial Number 476,359 of the present inventor entitled Weight Control Apparatus for Animals filed on even date herewith.

It is desirable in experimental research with animals for reliable results to work with a number of animals which are confined in separate cages and to maintain their weight substantially constant by a weight control apparatus such as that described and claimed in the application of the inventor referred to heretofore. Such weight control apparatus requires that feed be supplied to each confined animal when the animal has reached a predetermined feeding weight. The feed may be in the form of small solid pellets, and it is necessary that such pellets be supplied to each cage in which an animal is confined when the feeding weight of the animal calls for food pellets to be delivered to a respective cage.

The present feeder is an improvement upon previous feeders in that it can service a plurality of confined animals intermittently and substantially as rapidly as the weight of each animal calls for food pellets to be delivered and such pellets are delivered intermittently until the animal calling for food is brought to a predetermined target weight. Further, if desired intermittent feeding can be provided at any desired interval independent of the animal's weight and at different intervals for the several animals.

In general, the invention comprises a storage hopper which holds food pellets or the like which are to be fed to food trays located in each of a plurality of separate cages when the animals confined in such cages obtain a predetermined feeding weight.

The dispensing of food pellets to the animals is controlled by an electrical circuit in which there is a scale or weight responsive switch secured to each cage and selector switches for each cage secured to the feed dispensing unit of the invention.

The selector switches are secured to a circular disc or the like of the feed dispenser unit and correspond in number to the cages to be serviced with food. In addition, a plurality of annular spaced openings or apertures extend through the circular disc and correspond in number to the switches and cages. A receiving tube is rotated over the openings in the disc and is adapted to receive a food pellet from a storage hopper and to deposit it through the openings which are connected to each of the food trays of the cages in which the animals are confined by flexible connecting tubes.

When an animal in a particular cage calls for food, the scale switch of such cage closes and the selector switch on the circular disc is closed intermittently as the receiving tube rotates over the disc. If the scale switch is closed on the cage in question and the selector switch is closed, the latter occurring approximately every thirty seconds, the circuit is conditioned so that the hopper is opened and a food pellet passes by gravity from the hopper to the food tray of the cage calling for food, through the receiving tube and the opening in the disc corresponding to the cage calling for food and through the flexible discharge tube extending between the respective tray and the circular disc. Pellets are discharged intermittently such as every thirty seconds to the cage calling for food every time the selector switch for such cage is closed and until the scale switch of such cage opens. In the meantime all the other selector switches corresponding to the other cages which are to be serviced with food are checked intermittently by the closing of the selector switches as the receiving tube is rotated relative to the annular disc. Food pellets are supplied to the other cages if their scale switch and selector switch is closed and the circuit is thus conditioned to open the storage hopper and pass food pellets to such other cages.

Each of the normally open selector switches is located on the disc ahead of each opening in the disc with which it is associated and the actuator for the switches is offset from the pellet receiving tube so that each selector switch is continuously closed intermittently approximately one second before the receiving tube reaches any opening of the disc.

If it is desired to feed the animals at selected intervals, a separate timing switch can be provided for the respective cages to establish corresponding feeding periods. During the feeding period for any one cage, pellets are intermittently fed at fixed intervals to the corresponding animal.

A specific example of the operation of the apparatus is hereafter given with a more specific description of the parts of the apparatus. Assume that the animal in a cage is calling for a food pellet because the animal is underweight. This results in the closing of the scale switch on the corresponding cage. Thereafter, when the selector switch for cage in question is closed this closes the circuit and actuates a rotary solenoid on the pellet storage hopper. The solenoid actuates a disc which thereupon rotates and discharges a pellet through the bottom of the pellet storage hopper. When this occurs, a pellet drops into a flexible tube depending from the hopper and down and into the receiving tube and is wiped by the tube over the circular disc and through the opening and the spigot corresponding to such cage and thence down the discharge tube to the food tray of the cage. As long as such cage registers underweight and the cage switch is closed, pellets are fed to the cage tray, such as every thirty seconds or every time the actuator on the rotating shaft holding the receiving tube closes the selector switch corresponding to that cage and the receiving tube rotates past the opening in the disc for that cage. After the animal in such weight cage reaches its target weight, the switch on the weight cage opens to break the circuit to the rotary solenoid and thereby stops actuating the discharge disc in the pellet storage hopper. The shaft continues to be rotated by the timer motor which drives the rotary shaft, and the selector switches are intermittently closed by the actuator on such shaft but no pellets are again discharged until the circuit is again conditioned by the scale switch of a cage having an animal requiring food.

Each cage may be connected in the circuit by a separate on-off switch so that the scale switch of such cage can condition the circuit when actuated by the platform of the scale from which such scale is suspended. The intermittent closing of the selector switches such as every thirty seconds has the effect of testing the cages in that interval of time to ascertain whether the circuit is conditioned to deliver a food pellet to any particular cage. Since the selector switches close sequentially, food pellets can be sequentially delivered to all of the cages which have been conditioned to receive pellets by the scale switch pertaining to such cages.

The timing motor which rotates the actuator shaft is plugged into a separate power source and the speed of the motor can be changed or a faster or slower motor can be employed to control the rotation of the actuator shaft and the closing of the selector switches. Thus the timing motor might be set to close the selector switches every fifteen seconds and thus test each cage circuit at a faster interval of time. The timing motor is also built into the selective feeder and controls the rotating of the actuator shaft for delivery of pellets to all of the cages.

All of the cages are wired in parallel to the feeder so that a malfunction electrically in any one cage will not affect the electrical circuit of any other cage.

Other advantages of the invention may be observed from the embodiment thereof which is illustrated in the accompanying drawings.

In the drawings:

FIGURE 1 is a front elevational view illustrating the food dispenser connected to a feeding hopper and four cages for controlling the weight of confined animals;

FIG. 2 is a detail view showing the dspenser and its support with parts in elevation and in section;

FIG. 3 is a detailed sectional view illustrating the wiping action of the rotating tube of the unit with a pellet ready for discharge through the aperture and spigot of the rotating dispensing disc of the unit;

FIG. 4 is a top elevational view illustrating the actuation of the selector switches;

FIG. 5 is a detail sectional view with parts in elevation and illustrating the actuation of the selector switches; and FIG. 6 is a showing of the circuit employed to operate the dispersion feeder.

The selective animal feeding system of the invention is illustrated in general in FIGURE 1 and comprises an open housing 1 within which a novel selective feeder unit 2 is located. Housing 1 is secured to the frame 3 which rests on the support 4. A tubular food storage hopper 5 is supported on the top of frame 3 and is connected to feeder 2 by conduit or tube 6 and thence to four weight control cages 7 within which the confined animals are to be fed. Flexible discharge tubes 8 connect the feeder 2 to the cages 7 which are also resting on the support 4. Only four cages 7 are shown but as many as twelve cages have been employed with the selective feeder of the invention.

The illustrated feeder unit 2 of the invention comprises a base provided by a flat bottom plate 9 which is spaced beneath a generally circular plate 10 by a vertical plate 11. The circular plate 10 extends horizontally over the plate 9 in vertically spaced relation to provide a vertical recess between plates 9 and 10 and also slightly overhangs the vertical plate 11 in a direction opposite to bottom plate 9. The plates 9 and 11 are reinforced by the angular plate 12 which extends centrally between bottom plate 9 and vertical plate 11.

A circular disc 13 which has a diameter greater than circular plate 10 so that it overhangs plate 10 is secured in fixed position to plate 10 by nut and bolt units 14 which vertically space disc 13 from plate 10. Disc 13 has a plurality of annularly spaced apertures 15 adjacent its outer periphery and for purposes of illustration four such apertures are shown as such apertures correspond in number to the four cages 7. The spigots 16 have their upper ends secured within the apertures 15 of disc 13 and depend from the disc at a position free from and outwardly removed from plate 10.

A circular switch board 17 which has a central hub portion 18 and a diameter corresponding to plate 10 is located between plate 10 and disc 13 and is secured to plate 10. The board 17 is spaced from plate 10 by nuts 19. Four selector switches 20 which correspond in number to the apertures 15 and their respective spigots 16 are secured in annular spaced relation to the top of board 17 and the spring-like or leaf arms 21 of each switch extend inwardly toward the center portion 18 of board 17. The lowermost arm of each switch extends farther inwardly than the upper arm and the inner end 22 of each lower arm which lies beyond the contacts 23 of the arms has its edges turned upwardly.

Each selector switch 20 is located between apertures 15, and the outer ends of the arms 21 are connected by suitable leads, not shown, to the terminal board 24 which is mounted to the back of vertical plate 11.

A rotatable switch actuator shaft 25 extends upwardly through plate 10, switch board 17 and circular disc 13. The lower end of shaft 25 is supported in a gear housing 26 which is secured to the bottom of plate 10 within the recess between plates 9 and 10 and is connected in such housing to an electric timing motor 27 which is secured in place by small mounting screws 28. The timing motor 27 is connected to a power source, not shown, by the cord 29 and plug 30. The motor 27 drives actuator shaft 25 continuously when the timing motor is plugged in and the dispensing unit is in operation, at the speed at which motor 27 is set. An actuator 31 is secured to the hub portion 18 which is most clearly shown in FIG. 5, and which is rotated by shaft 25. Actuator 31 is secured in line with the inner end 22 of each selector switch arm so that when shaft 25 rotates the switch follower portion 22 of each switch 20 is engaged to intermittently cam the corresponding switch closed. The closing of each selector switch 20 occurs such as approximately every thirty seconds if that reflects the speed of motor 28 and each switch remains closed for a short fraction of time.

The upper end of actuator shaft 25 carries an open frame member 32 which extends upwardly from shaft 25. A generally rigid food receiving tube 33 extends upwardly from frame 32 and tube 33 passes downwardly through frame 32 and then turns angularly outwardly so that the lower end 34 of the tube can wipe over disc 13 slightly above apertures 15 when rotated by frame 32, shaft 25 and motor 27. The lower end 34 of tube 33 is provided in a flat horizontal plane so that it can wipe over the disc 13 and as shown in FIG. 3 readily carry a food pellet 35 with it over disc 13 for discharge through an aperture 15 and into a spigot 16 having an essentially cylindrical opening.

Each spigot 16 on disc 13 is connected to a respective cage 7 by a flexible conduit or tube 8, the lower end of each tube 8 being aligned with the receiving end of a food tray 36 but out of engagement with the respective tray which it services so that the cage 7 to which tray 36 is secured will not be affected by tube 8 in its movement. Each tube 8 adjacent to a cage 7 is connected to a stand 37 by a bracket 38 and the loop stick 39. The loop stick 39 is formed of a suitable readily bent wire and prevents engagement of tube 8 with the cage 7 which it is servicing. A food pellet 35 passing through an aperture 15 in disc 13 and an aligned spigot 16 can freely move by gravity down through a tube 8 and to the food tray 36 of the cage 7 which is to be serviced.

The food pellets 35 which are to be fed to the animals are stored in the tubular hopper 5 which as described previously is secured to frame 3. The receiving tube 33 which receives pellets 35 from hopper 5 is connected to hopper 5 by a flexible straw-like tube 6 which depends from an aperture 41 in the bottom plate 40 of hopper 5 and projects into tube 33 as shown at 42 in FIG. 2. The flexible construction of tube 6 absorbs any misalignment between hopper 5 and the receiving tube 33 should this occur to prevent jamming of the pellets therebetween, although other alignment compensating means can also be provided.

The food pellets 35 are confined in hopper 5 and are discharged one by one through aperture 41 by rotation of the disc 43 within the bottom of the hopper 5 above bottom plate 40. Disc 43 has spaced apertures 44 for receiving a pellet 35 and as the disc 43 is rotated a single pellet is discharged through a respective discharge aperture 44 and aligned aperture 41 to tube 6 by the wiper 45 which is fixed to the housing 46 of hopper 5.

Rotation of disc 43 is accomplished by a rotary solenoid 47 which is actuated by a scale switch 48 one of which is associated with each cage 7 when food is called for by one of the confined animals. As described in the application referred to previously, circuit conditioning scale switch 48 is located at the top of each cage 7 and each switch 48 is closed by the scale platform 49 when the animal in a respective cage 7 is underweight. When solenoid 47 is actuated it rotates gears 50 which connect to disc 43. The solenoid 47 is located on a support 51 resting on frame 3 and which is secured to the depending portion 52 of the housing 46 of hopper 5.

The solenoid 47 is connected to the terminal board 24 by suitable leads, not shown.

For operation of the animal food dispenser reference to the electrical control circuit must be made and such circuit is illustrated in FIG. 6. In general, the control circuit includes four corresponding branches 53, 54, 55 and 56, one branch for each of the cages 7 which are connected as a part of a signaling circuit for operating the pellet feeding hopper 5.

The signaling circuit and the rotary solenoid circuit are connected respectively to suitable incoming power leads 57 and 58 which may terminate in plugs, not shown, for connection to the standard 110 volt alternating current power distribution system. The signaling circuit is connected through a step down transformer 59 to provide a suitable low voltage input to the control circuit. The transformer 59 is bolted as by bolt units 60 to the bottom plate 9 of the dispenser unit on one side of the angular reinforcing plate 12, as may be seen in FIG. 2. Each cage actuated scale switch 48 is connected in series with a respective selective feeder actuated selector switch 20 in one of the respective branches 53, 54, 55 or 56 of the circuit and a control relay 61 is connected across the output of the transformer 59. An on-off cage switch 61a is provided for each of the cages 7; for example as shown in the previously identified application and connected in the related branch of the control circuit as shown in FIG. 6.

Relay 61 is secured to bottom plate 9 on the side of plate 12 opposite the location of transformer 60 as may be seen in FIG. 2, and transformer 60 and relay 61 are connected in the circuit through terminal board 24.

Thus, referring to branch 53 which is the same as the other branches of the circuit for the purposes of this description, when cage scale switch 48 is closed by the feeding weight of the animal in the corresponding cage 7 calling for food which it is assumed is the first cage on the left-hand side of FIGURE 1, and the selector switch 20 is closed momentarily by the actuator 31 of rotating shaft 25 which corresponds to such cage 7, the energizing circuit of relay 61 is actuated to energize a set of associated contacts 62 and 63. Closing of contactors 62 which are connected in the circuit of solenoid 47 causes actuation of the solenoid 47 and rotation of the feeder disc 43 to discharge a food pellet 35 from hopper 5 through flexible tube 6 to receiving tube 33. Since the actuator 31 on member 18 is offset ahead of receiving tube 33 the food pellet 35 is dropped from tube 33 onto disc 13 and wiped over the disc 13 for discharge through aperture 15, spigot 16 and discharge tube 8 to food tray 36 of cage 7, the first cage at the left-hand side of FIGURE 1 which is calling for food. The discharge of a food pellet 35 to the food tray 36 of the described cage 7 requiring service continues intermittently at fixed intervals as tube 33 rotates over disc 13 and intermittently deposits a food pellet 35 to feed the animal in the described cage 7 calling for food because of its weight condition. Each switch 20 is preferably held closed for a period of rotation to the incoming side of the corresponding spigot 16 and in an actual device for feeding of twelve animals the switch was closed for essentially the complete movement over the solid portion of the disc 13.

In the illustrated embodiment of the invention, the control relay 61 is shown as including two sets of contacts 62 and 63 with the second set 63 connected to a totalizing register or recorder 64 for each one of the circuits 53–56. Each time the control relay 61 is actuated to fire the pellet feeder hopper 5, the recorder 64 will simultaneously be actuated to record that action and consequently will provide a continuous record of the feeding. The recorder 64 can be of any suitable variety or type which may merely record the number of pellets 35 discharged or may actually include a time scale to simultaneously record the pellets and the time of feeding.

Recording of individual feedings can be provided as shown in FIG. 6 wherein an individual recording relay 65 forms a part of each of the branch circuits 53–56 and is connected in the branch circuit in series with the switches 20 and 48. The individual recording relay 65 therefore will be actuated only when the corresponding branch is completed to fire the pellet feeder hopper 5. Each relay 65 includes suitable contacts 66 connected to a suitable recorder 67.

The control relay 61 is selected to operate with a required voltage. The control transformer 60 is connected to establish an output voltage suitable for driving both the individual recording relays 65 and the main control relay 61. If for any reason it is desired not to effect the recording of the several individual branches 53–56 and the relays 65 are removed or a jumper lead, not shown, is connected across the input terminals of the respective relays 65, a greater voltage would then be applied to the main control relay 61. In the illustrated embodiment of the invention a dropping resistor 68 is selectively connected into the circuit through a single pole, double throw switch 69 which in the alternate bypasses the resistor 69. In actual practice, it is merely necessary to provide a resistor or a jumper lead, not shown, to be connected directly to the terminal board 24 and the control relay 61, the switch mechanism 69 being shown for purposes of illustration.

Another feature of the automatic animal feeder is that it can feed some animals on a weight schedule while timers may control the feeding of other animals but through the same automatic feeder and this is desirable when comparing the controlled and timed weight schedule feeding methods without changing the housing of the animals. All animals would be confined in the weight control cages 7. Some of them would be fed according to weight control. Others would be fed on interval or time schedules. Also precise amounts of food may be fed to the animals by the automatic selective feeder and a timer because approximately ninety-seven milligrams are delivered every thirty seconds. The timer can be turned on for a period of time which would be equal to the amount of food it is desired to feed an animal after which the timer would turn off and the supplying of food would terminate. Recycling, it would do this, for example, every hour, every five hours, or every day. By feeding a precise amount of food to a particular cage 7, each cage requiring the same amount of food or the same schedule would require only one timer for the entire bank of cages 7. However, if there were two different schedules being maintained; for instance six animals on one schedule and six animals on another, then two timers would be required, one for each schedule but no timers would be required for each individual cage 7. Such timers could be wired across so that any particular cage in the twelve, if that is the number used, could be on the schedule that the timer is setting. This is quite an advantage in the case where the constant weight method is not employed in that the automatic selective feeder of the invention could be employed to feed time controlled amounts of food whereas this was done by hand previously. Such feeding method could be accomplished without the use of the constant weight cages 7 as the weight of the animals is not a controlling factor of feeding in this example.

By setting the automatic selective feeder so that the animal calling for food is fed such as every thirty seconds, the animal would not develop any behavior which would upset the experiments to be carried out with such animal.

If the automatic selective feeders are set to feed a food pellet every thirty seconds then the first cage calling for food will receive a pellet and then every other cage is checked to determine whether a pellet is required so that when the thirty second interval is up, the first cage is again checked by the feeder and may receive another pellet if the weight of the animal still calls for food. The automatic selective feeder may be operated continuously for as long as it is desired to feed and experiment with the animals confined in the cages which are being serviced.

The apparatus of the invention automatically can feed a plurality of animals day and night over an extended period of time.

Various modes of carrying out the invention are contemplated as being within the scope of the following claims particularly pointing out and distinctly claiming the subject matter which is regarded as the invention.

I claim:

1. An automatic selective feeding apparatus adapted to be actuated to supply food intermittently to a plurality of confined animals from a food storage hopper disposed above the feeding apparatus which comprises,
   an electrical circuit connected to the feeding apparatus and to a power source with such circuit having a circuit conditioning switch for each confined animal which are actuated respectively when food is to be supplied to the animal with which any such switch is associated,
   a selector switch in said circuit for each animal in series with the corresponding conditioning switch and intermittently closeable at selected intervals of time,
   and means connected in said circuit and conditioned to open said hopper when a conditioning switch is closed and a corresponding selector switch is closed to pass food from the hopper to the animal serviced by said last named conditioning and selector switches.

2. An automatic selective feeding apparatus for supplying food intermittently to a plurality of animals confined in weight control cages when the weight of the animal in any cage obtains a predetermined feeding weight which comprises,
   an electrical circuit connected to the feeding apparatus and to a power source and having normally open circuit conditioning switches therein corresponding in number to each cage and with each conditioning switch being closed by its respective cage when the animal in any such cage reaches feeding weight,
   selector switches in said circuit corresponding in number to the cages and with each selector switch being in series with a conditioning switch,
   means to close each selector switch intermittently at selected intervals of time,
   a circular member disposed above the selector switches and having a plurality of annularly spaced openings therein offset from said switches and corresponding in number to the selector switches and the cages,
   a first conduit connecting each annular opening to a cage and a second conduit extending over the circular member and adapted to be rotated over the openings in the disc to connect the openings to the load hopper,
   and means connected in said circuit and conditioned to open said hopper when a conditioning switch is closed and a corresponding selector switch is closed to pass food through the second conduit down through an opening in the disc and thence through the first conduit to the cage to be serviced with food.

3. The automatic selective feeding apparatus of claim 2 in which the second conduit therein extends vertically upwardly toward the hopper and then angularly outwardly to a position over the openings in the circular member and slightly removed therefrom so that food discharged from the hopper is wiped over the circular member before discharge into an opening in the circular member.

4. The automatic selective feeding apparatus of claim 2 in which the second conduit therein is connected to the hopper by a flexible tube to prevent jamming of food passing from the hopper to the second conduit.

5. The automatic selective feeding apparatus of claim 2 in which a rotatable shaft extends upwardly through the circular member and is secured to the second conduit, a timing motor connected to the shaft and adapted to rotate the shaft at predetermined rates of speed to control the rotation of the second conduit over the circular member, and an actuator on said shaft intermittently disposed in engagement with the selector switches to intermittently close each switch ahead of the second conduit as the latter is rotated over the circular member.

6. The automatic selective feeding apparatus of claim 2 in which the means opening the hopper is a rotary solenoid valve, a rotatable disc disposed in the bottom of the hopper and rotated by said valve, and spaced openings in the disc to discharge a single food material intermittently to the flexible connecting tube and the second conduit.

7. An automatic selective feeder assembly for supplying food intermittently to a plurality of animals confined in weight control cages when the weight of any of the confined animals obtains a predetermined feeding weight, which comprises,
   a circular disc having a plurality of annular spaced apertures extending therethrough,
   discharge conduit means connecting each of said apertures to a separate cage,
   selector switches corresponding in number to the annular spaced apertures with said switches being secured to the disc and having switch arms projecting inwardly thereof,
   an actuator shaft extending upwardly through the center of the disc and having a switch actuator thereon adapted to intermittently engage and close each of the selector switches,
   a food receiving tube secured to the shaft and extending upwardly therefrom and thence downwardly and outwardly at an angle to pass over the annular apertures in said disc,
   power means provided to establish relative rotation between the actuator shaft and disc so that the selector switches are intermittently closed and the food receiving tube continuously passes over the apertures in the disc,
   a scale switch associated with each cage and adapted to be closed by action of the cage when an animal reaches predetermined feeding weight to condition the electrical circuit for operation of the dispersion unit,
   a food storage hopper disposed above the food receiving tube and connected thereto for flow of food from the hopper to the tube when the hopper is open, and
   electrical means connected to the food hopper and adapted when the circuit is conditioned by the closing of a scale switch and a selector switch corresponding thereto to open the food storage hopper for the discharge of food to the receiving tube and thence downwardly through the receiveing tube and through the aperture of the disc and discharge conduit to the cage calling for food.

8. An automatic selective feeder assembly for supplying food intermittently, comprising
   a disc having a plurality of spaced apertures extending therethrough and spaced circumferentially thereof, said disc including an upstanding centrally located shaft,
   discharge conduit means connected to each of said apertures,
   selector switches corresponding in number to the spaced apertures with said switches being secured to the disc and having switch arms disposed in a selected array, a switch actuator mounted for relative traverse movement over the switches to intermittently engage and close each of the selector switches in sequence, a food receiving tube secured to the shaft and extending upwardly therefrom and thence downwardly and outwardly at an angle to pass over selected apertures in said disc, and electrical means connected to the selector switches and conditioned by the closing of a selector switch for controlling delivery of food to the receiving tube and thence downwardly through the receiving tube and through the aperture of the disc and discharge conduit.

9. An automatic selective feeder assembly for supplying food intermittently to a plurality of animals, which comprises a circular disc having a plurality of annular spaced apertures extending therethrough, discharge conduit means connecting each of said apertures to a separate cage, selector switches corresponding in number to the annular spaced apertures with said switches being secured to the disc and having switch arms projecting inwardly thereto, an actuator shaft extending upwardly through the center of the disc and having a switch actuator thereon adapted to intermittently engage and close each of the selector switches, a food receiving tube secured to the shaft and extending upwardly therefrom and thence downwardly and outwardly at an angle to pass over the annular apertures in said disc, power means provided to establish relative rotation between the actuator shaft and disc so that the selector switches are intermittently closed and the food receiving tube continuously passes over the apertures in the disc, and electrical means connected to the selector switches and conditioned by the closing of a selector switch for controlling delivery of food to the receiving tube and thence downwardly through the receiving tube and through the aperture of the disc and discharge conduit to the cage calling for food.

10. The selective feeder assembly of claim 9 having said selector switches offset to the one side of the apertures and having said actuator and said tube aligned and rotated in synchronism.

11. A selective feeder assembly of claim 8 wherein said switch actuator actuates a given selector switch before the corresponding tube is aligned with a corresponding aperture.

References Cited by the Examiner

UNITED STATES PATENTS

| | | | |
|---|---|---|---|
| 888,464 | 5/1908 | Burri et al. | 141—104 |
| 2,601,534 | 6/1952 | Laffoon | 222—410 X |
| 2,684,803 | 7/1954 | Birkland et al. | 141—83 X |
| 2,819,699 | 1/1958 | Klettke | 119—51 |
| 2,848,144 | 8/1958 | Haskell et al. | 222—330 |
| 2,880,912 | 4/1959 | Fisher | 141—104 X |
| 3,094,181 | 6/1963 | Kershaw | 177—1 |
| 3,111,113 | 11/1963 | Jaquith | 119—51.11 |
| 3,119,523 | 1/1964 | Jaffe | 41—94 X |

SAMUEL KOREN, *Primary Examiner.*

ALDRICH F. MEDBERY, *Examiner.*